(12) United States Patent
Yao

(10) Patent No.: US 7,693,128 B2
(45) Date of Patent: Apr. 6, 2010

(54) MANAGING PACKETS FOR TRANSMISSION IN A COMMUNICATION SYSTEM

(75) Inventor: Peilin Yao, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 650 days.

(21) Appl. No.: 11/360,218

(22) Filed: Feb. 23, 2006

(65) Prior Publication Data

US 2007/0195789 A1 Aug. 23, 2007

(51) Int. Cl.
  *H04B 7/212* (2006.01)
(52) U.S. Cl. .................................................. 370/347
(58) Field of Classification Search ............ 370/395.21, 370/347, 229, 332
  See application file for complete search history.

(56) References Cited

U.S. PATENT DOCUMENTS

| | | | | |
|---|---|---|---|---|
| 5,793,747 A * | 8/1998 | Kline | .......................... | 370/230 |
| 2002/0122385 A1* | 9/2002 | Banerjee | ..................... | 370/229 |
| 2003/0198204 A1* | 10/2003 | Taneja et al. | ................. | 370/332 |
| 2003/0235179 A1* | 12/2003 | Tuomela et al. | ............. | 370/347 |
| 2004/0081167 A1* | 4/2004 | Hassan-Ali et al. | .... | 370/395.42 |
| 2004/0165596 A1* | 8/2004 | Garcia et al. | ........... | 370/395.21 |
| 2005/0055442 A1* | 3/2005 | Reeves et al. | ................ | 709/225 |
| 2005/0094643 A1 | 5/2005 | Wang et al. | | |

* cited by examiner

*Primary Examiner*—Ayaz R Sheikh
*Assistant Examiner*—Hai-Chang Hsiung
(74) *Attorney, Agent, or Firm*—Charles W. Bethards

(57) ABSTRACT

Methods (400, 500) and corresponding systems (100, 200, 300) for managing a packet (318) for transmission include obtaining a quality of service (QoS) parameter value for a data stream (404), and determining one or more QoS statistics for previously transmitted data (406). Thereafter, a packet is selected from the data stream (408), and scheduling information is estimated for the packet (410) based upon the QoS statistics and the QoS parameter value. The scheduling information is assigned (414) to the packet. A transmission time window of a transmission buffer is determined (506). If the scheduling information assigned to the packet falls within the transmission time window (508), the packet is queued for transmission in the transmission buffer. The labeled packet can be arranged among one or more queued packets in response to comparing scheduling information of the labeled packet and the queued packets.

16 Claims, 4 Drawing Sheets

MANAGING PACKETS FOR TRANSMISSION IN A COMMUNICATION SYSTEM

FIELD OF THE INVENTION

This invention relates in general to data communication and more specifically to techniques and apparatus for managing packets for transmission in a data communication system based upon quality of service parameters and quality of service statistics.

BACKGROUND OF THE INVENTION

A user of a communication system may subscribe to communication services offered by a communication network provider under an agreement that guarantees performance. Examples of performance guarantees include data throughput, or latency bounds, or other similar metrics based on mutually agreed measures of a network protocol. This agreement, which may be known as a Service Level Agreement (SLA), typically contains a defined quality of service.

Different types of network traffic may require a specific quality of service. For example, streaming multimedia, internet protocol (IP), and safety-critical applications, such as remote surgery, each require a specific quality of service or a guaranteed data transfer service. These types of services are called "inelastic," meaning that they require a certain level of bandwidth to function—if they get more than the required bandwidth they can't use it, and if they get less, they can't function at all. By contrast, "elastic" applications can take advantage of however much or little bandwidth is available.

In order to comply with the SLA, and in order to efficiently distribute required bandwidth among the one or more subscriber stations in a communication network, it is advantageous to monitor, control, and limit bandwidth granted to subscriber stations, both individually and collectively.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages, all in accordance with the present invention.

DETAILED DESCRIPTION

In overview, the present disclosure concerns managing packets for scheduled transmission in accordance with quality of service parameters and quality of service statistics in a communication system. More particularly various inventive concepts and principles embodied in methods and apparatus may be used for selecting and arranging packets for transmitting in a data frame in a communications system.

While the data packet management system of particular interest may vary widely, one embodiment may advantageously be used in a wireless communication system or a wireless networking system having a wireless transmitter and receiver operating according to one or more standards, such as, for example, a wireless networking standard 802.16, which is published by the IEEE-SA (Institute of Electrical and Electronics Engineers Standards Association). However, the inventive concepts and principles taught herein may be advantageously applied to other broadband communications systems wherein bandwidth is requested, granted, and scheduled according to one or more quality of service parameters.

The instant disclosure is provided to further explain, in an enabling fashion, the best modes, at the time of the application, of making and using various embodiments in accordance with the present invention. The disclosure is further offered to enhance an understanding and appreciation for the inventive principles and advantages thereof, rather than to limit the invention in any manner. The invention is defined solely by the appended claims, including any amendments made during the pendency of this application, and all equivalents of those claims as issued.

It is further understood that the use of relational terms, if any, such as first and second, top and bottom, and the like, are used solely to distinguish one entity or action from another without necessarily requiring or implying any actual such relationship or order between such entities or actions.

Much of the inventive functionality and many of the inventive principles are best implemented with, or in, integrated circuits (ICs), including possibly application specific ICs, or ICs with integrated processing controlled by embedded software or firmware. It is expected that one of ordinary skill—notwithstanding possibly significant effort and many design choices motivated by, for example, available time, current technology, and economic considerations—when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
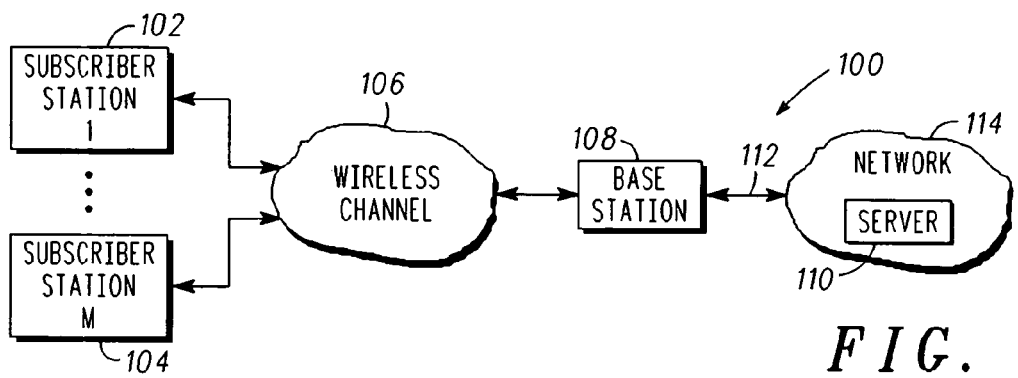
FIG. 1 depicts, in a simplified and representative form, a high level diagram of a communications system.

Referring to FIG. 1, a high-level diagram of a data communication system in accordance with one or more embodiments will be briefly discussed and described. In FIG. 1, communication system 100 includes a plurality of subscriber stations 102 and 104, which communicate via wireless channel 106 with base station 108. Examples of subscriber stations 102 and 104 include cellular phones, wireless media devices, and other similar data transceiving devices. Subscriber stations 102 and 104 may be known, in some embodiments, as "peripheral network nodes," which are devices connected as part of a computer network, near or at the edge of the network. Base station 108 can be coupled to server 110 by communication link 112 and network 114. Network 114 can include a local area network, or a connection to the Internet, or both. Server 110 represents one of perhaps several such servers connected to the network that are capable of providing services, information, or control functions for other devices, or network nodes, connected to the network. For example, server 110 can be used to control the functions of base station 108, including such functions as managing uplink data transmissions from subscriber stations 102 and 104.

In the field of wireless networking, the portion of communication system 100 between subscriber stations 102 and 104 and base station 108 may commonly be referred to as an access network, which can include a broadband wireless access (BWA) network, which provides high speed connections to the Internet for providing the subscriber stations with, e.g., integrated data, voice, and video services.

In one embodiment, subscriber stations 102 and 104 communicate with a station 108 according to BWA communication standard 802.16, which is a widely known and precisely documented standard published by the Institute of Electrical and Electronics Engineers Standards Association (IEEE-SA). In this standard, and in perhaps other similar standards now known or yet to be developed, subscriber stations 102 and 104 request bandwidth from base station 108 (or whatever server or entity is controlling base station 108) for uplink transmissions from the subscriber stations. Typically, such bandwidth is scheduled and granted to subscriber stations 102 and 104, to the extent bandwidth is available, and in compliance with each subscriber's SLA.

Figure 2:
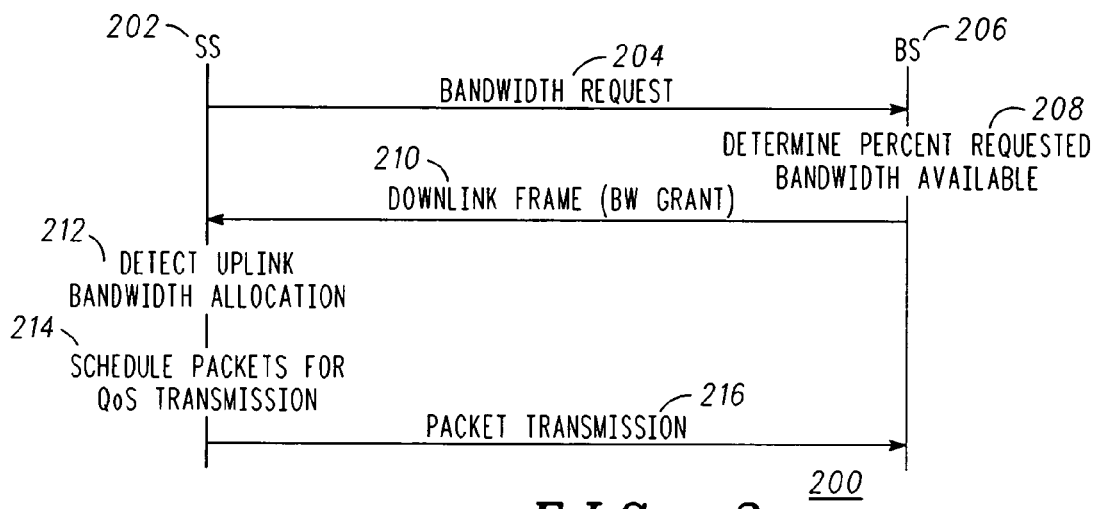
FIG. 2 shows a model of a communications protocol for requesting and granting bandwidth in a communication link having a specified quality of service.

For example, referring to FIG. 2, there is depicted a representative model 200 of a communication protocol for requesting and granting bandwidth in a communication link between a subscriber station and a base station in accordance with one or more embodiments. As shown, subscriber station 202 sends bandwidth request message 204 to base station 206. The request asks for permission to transmit a specified number of bytes within a specified time window, which can be represented by a subsequent uplink transmission frame duration or a portion thereof.

As shown at block 208, base station 206 determines the bandwidth to grant (e.g., what percent of the requested bandwidth) by determining whether or not the complete request can be granted. If base station 206 is running out of available bandwidth for other subscriber stations, base station 206 may not be able to completely comply with the request by scheduling all requested bandwidth. On the other hand, if the requested bandwidth is available, the base station will probably grant all bandwidth that was requested. Such decisions regarding whether or not to schedule bandwidth, and the allocation of available bandwidth to various subscriber stations, are typically made by a server that controls the base station, such as server 110 in network 114.

Following bandwidth request 204, base station 206 will respond by sending bandwidth grant message 210 to subscriber station 202. Grant message 210 contains information specifying the number of bytes that may be transmitted, and the times during which those bites may be transmitted. This message represents the allocation of bandwidth made by the base station and the server controlling the base station. Grant message 210 usually includes a frequency or subchannels for data transmission, and other specified parameters that specify how data is multiplexed on the uplink. Grant message 210 is typically transmitted to subscriber station 202 in a downlink data frame.

When subscriber station 202 receives grant message 210, subscriber station 202 detects the message and allocates uplink transmission time according to all the relevant parameters. After allocating uplink transmission times, subscriber station 202 can schedule packets for transmission in accordance with a required, and predetermined, quality of service, as illustrated at block 214. Once scheduled, packets are transmitted as shown at packet transmission 216.

In addition to requesting bandwidth, the subscriber unit may also require a quality of service to support the different data transmission needs of different applications. For instance, voice and video require low latency, but can tolerate some error rate. By contrast, generic data applications cannot tolerate error, but latency is not critical. The protocol standard accommodates voice, video, and other data transmissions by using appropriate features in the MAC (media access control) layer, which can be more efficient than doing so in layers of control overlaid on the MAC layer.

Figure 3:
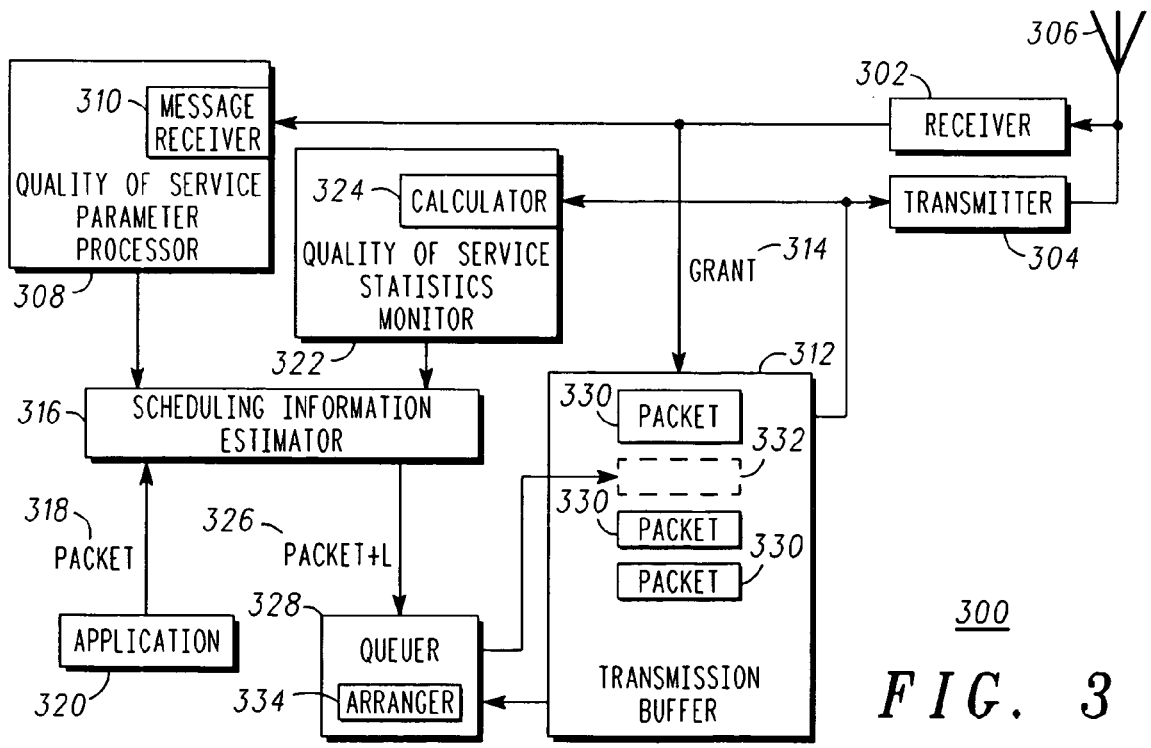
FIG. 3 depicts a representative diagram of a subscriber station having a statistics-driven adaptive packet scheduler in accordance with one or more embodiments.

With reference now to FIG. 3, there is depicted a block diagram of relevant portions of subscriber station 300 in accordance with one or more embodiments. As illustrated in FIG. 3, subscriber station 300 includes receiver 302 and transmitter 304, which are both coupled to antenna 306. In one embodiment, receiver 302 downconverts and demodulates data received by antenna 306 so that the output of receiver 302 is baseband traffic data and messages that control or otherwise manage subscriber station 300. Similarly, data that is modulated, upconverted and output by transmitter 304 is transmitted from antenna 306.

Data output by receiver 302 is coupled to quality of service parameter processor 308, which is responsible for receiving and monitoring control messages that control the quality of service of data transmission from subscriber station 300. Thus, quality of service parameter processor 308 can include message receiver 310, which monitors received data, and parses and processes quality of service parameters that set, for example, the speed at which uplink data may be transmitted. Message receiver 310 can be implemented in hardware, software, or some combination of both. In some embodiments, quality of service parameter processor 308 may negotiate with base station 108 (or server 110) for the right to transmit with a speed and quality up to an agreed upon quality of service value, which quality is usually determined by the SLA (service level agreement) that covers the service provided to the subscriber station.

Note that there may be times when the subscriber station will not be permitted to transmit uplink data at a speed equal to the maximum quality of service set forth in the SLA. Such times can occur when the base station is congested with simultaneous requests for bandwidth from several subscriber stations. This means that the quality of service parameter value received from the base station may vary from time-to-time according to the current contracted level of service (e.g., the SLA) and the current ability of the base station to allocate uplink traffic bandwidth.

The output of receiver 302 can also be coupled to transmission buffer 312 for receiving and processing grant messages 314. Grant messages are messages from the base station that grant bandwidth, which in one embodiment is permission to transmit uplink data during one or more scheduled periods of time specified in the message. In response to a grant message 314, transmission buffer 312 allocates or reserves space in a data frame for transmitting bytes to the base station in compliance with the uplink bandwidth grant message. Transmission buffer 312 will be discussed in greater detail below.

Quality of service parameter processor 308 is coupled to scheduling information estimator 316. Scheduling information estimator 316 estimates scheduling information that is used to determine a transmission time for a data packet, such as unlabeled packet 318 output by application 320. In one embodiment, scheduling information defines or corresponds to a scheduling window, which is a period of time during which the packet can be transmitted. Application 320, which acts as a data source for data packets to transmit on the uplink channel, can be a voice encoder, a video encoder, or an application that transmits data, such as a file transfer application, or other similar applications.

Scheduling information estimator 316 is also coupled to, and receives data from, quality of service statistics monitor 322, which calculates quality of service statistics based upon data previously transmitted from the subscriber station during a particular time window. For example, quality of service statistics monitor 322 can include calculator 324, which calculates an average bit rate or other average data rate during an immediately preceding time window. As an example of one embodiment, the time window can be 2.5 milliseconds. In other embodiments, the calculated quality of service statistic can be a peak bit rate during a preceding time window, or an estimated sustained traffic rate statistic, or a minimum reserve traffic rate statistic. Other similar data transmission statistics can be calculated for use in complying with various standards, such as the 802.16e standard.

Thus, it should be apparent that the scheduling information is determined or calculated based on both quality of service statistics and quality of service parameter values. In one embodiment, scheduling information can include an earliest transmission time (noted as "tx") and a maximum delay time (noted as "T") for unlabeled packet 318, which is to be scheduled and transmitted in a data frame on the uplink channel.

Once scheduling information is estimated, scheduling information estimator 316 assigns the scheduling information to unlabeled packet 318 to produce a labeled packet 326 (which is shown as "PACKET+L" in FIG. 3). This assignment of, or labeling with, scheduling information can be implemented in several ways, including using software to append the scheduling information to the data packet, or by using software to record the scheduling information in a data table, matrix, or database that relates or links the scheduling information to a particular labeled packet. In a hardware or firmware implementation, such scheduling information can be appended to the data packet in data memory. Thus, scheduling information can be stored with the packet, or it can be more loosely associated with the packet by being stored in tabular form in a table entry linked to the packet.

Labeled packets 326 produced as an output of scheduling information estimator 316 are coupled to queuer 328. Queuer 328 examines scheduling information associated with labeled packet 326 and determines whether or not the packet should be transmitted in a particular transmission buffer 312 that has a specified transmission start time and transmission end time according to grant message 314.

Queuer 328 can also determine a transmission order of queued packets 330 in a transmission time window represented by transmission buffer 312. As shown, labeled packet 326 can be arranged in transmission order among queued packets 330 within transmission buffer 312 by arranger 334 within queuer 328. When packet 332 is placed in transmission buffer 312 it becomes a queued packet 330.

At the transmission start time of transmission buffer 312, queued packets 330 are passed to transmitter 304 in transmission order until all packets have been transmitted and the transmission end time approaches.

Note that the system in subscriber station 300 may be executing or processing several functions substantially simultaneously. For example, scheduling information estimator 316 can be processing and labeling unlabeled packets 318 to produce labeled packets 326, while queuer 328 determines whether or not labeled packets 326 are queued in transmission buffer 312, and if they are queued, in what transmission order. In embodiments where multiple processes are running, typical multitasking techniques may be used, such as sharing CPU (central processing unit) cycles and accessing shared memory space.

Figure 4:
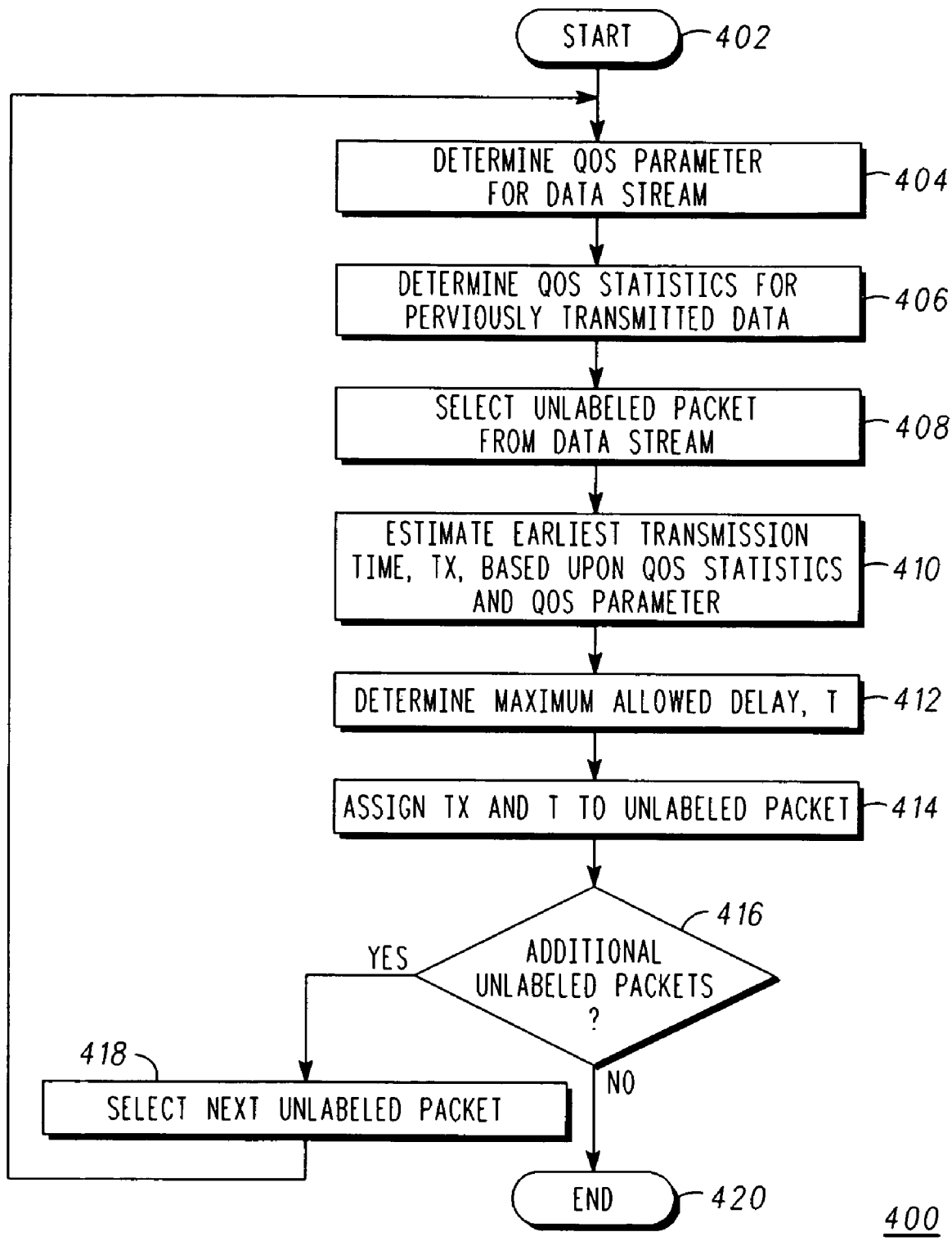
FIG. 4 shows a high-level flowchart of processes executed by a communication system that may be used to label packets with scheduling information in conjunction with the system of FIGS. 1-3 in accordance with one or more embodiments.

Turning now to the operation of subscriber station 300, in FIG. 4 there is depicted a high-level flowchart 400 of exemplary processes executed by portions of a network node or subscriber station, such as subscriber station 102, which is shown in the system of FIG. 1, or executed by another similar apparatus, in accordance with one or more embodiments. As illustrated, the process begins at block 402, and thereafter passes to block 404 wherein the process determines a quality of service parameter for a particular data stream. An example of the quality of service parameter is an average bit rate measured during a time window, such as a 2.5 millisecond time window.

Various communications standards that support data communication with guaranteed quality of service levels, such as the 802.16 communication standard, specify certain limits, measurements, or communication metrics that are used as upper or lower boundaries for transmitting data. These may be collectively referred to as "quality of service parameters." Many of these quality of service parameters are negotiated and agreed upon when the subscriber station user enters into a contract (e.g., an SLA) for communication services with a communication network provider. For example, the user may purchase a cellular telephone that transfers data at rates between a minimum rate and a maximum rate. In other embodiments, such limits and parameters can be agreed upon, or negotiated, when they are requested at the time of their use, or upon their demand.

Whatever the standard used, and whatever the parameters involved, the process can determine the quality of service parameters by negotiating with the base station, and perhaps any server controlling the base station, for permission to transmit data according to a quality of service level. Alternatively, the quality of service parameter for the data stream can be recalled from memory in the subscriber unit. This process may be implemented in quality of service parameter processor 308 shown in FIG. 3, which is coupled to a data output of receiver 302, and which can include message receiver 310 for monitoring, parsing, and decoding messages or control data that set a quality of service parameter in the subscriber station.

After determining the quality of service parameter, the process determines a quality of service statistic for previously transmitted data, as illustrated at block 406. An example of such a quality of service statistic is an average data transmission rate during a previous measurement time window during which data was transmitted on the uplink from the subscriber station to the base station. This process of measuring quality of service statistics may be implemented by a calculator, such as calculator 324, within quality of service statistics monitor 322, as shown in FIG. 3. Note that calculator 324 is functionally coupled to data passing from transmission buffer 312 to transmitter 304 for the purpose of monitoring the quantity of data over the measurement period. Calculator 324 can measure an average bit rate, a peak bit rate, or other such quality of service statistics.

Next, the process selects an unlabeled packet from the data stream, as depicted at block 408. Such unlabeled packets are output by a packet source that creates a stream of data. For example, the packet source can be an application running in the subscriber station, where the application is, for example, a video streaming program, a program for streaming voice, or a program for transferring data or files, which data may come from an attached personal computer or other similar source of data.

Selecting an unlabeled packet may be implemented in scheduling information estimator 316, which processes packets generated by application 320. In some embodiments, there can be two data sources producing streams of data in packets. Multiple data sources can arise as a result of two applications 320 running simultaneously in subscriber station 300. When more than one data source is present, the process alternates selecting the next available unlabeled packet in each data stream. If one data stream produces more packets, typically because that data stream has a higher data rate, the process may select one or more packets in the high speed data stream before alternating to select packets in the other lower speed data stream.

Next, the process estimates scheduling information for the selected unlabeled packet based on the quality of service statistic and the quality of service parameter. In one embodiment, which is depicted at block 410, the process of estimating scheduling information includes estimating an earliest transmission time (tx) based on the quality of service statistic and the quality of service parameter value. Additional scheduling information is estimated at block 412, which shows a process of determining a maximum allowed delay, T.

The scheduling information can be used to determine whether or not a labeled packet will be transmitted within the transmission time window of a transmission buffer. In one embodiment, the scheduling information indicates a time window, or a scheduling window, for transmitting the selected unlabeled packet. The time window is a period of time during which the packet can be transmitted without exceeding, for example, a maximum bit rate parameter, and without exceeding a maximum delay, which can cause the packet to be received too late, and cause a noticeable interruption in a real time data stream. As shown in blocks 410 and 412, the scheduling information time window can be expressed as an earliest transmission time (tx) and a maximum delay time (T) which is measured from the earliest transmission time. Alternatively, the scheduling information time window can be expressed as an earliest transmission time and a latest transmission time.

As an example of calculating scheduling information, a quality of service statistic measuring an average bit rate of a particular connection or identified data stream can indicate that the subscriber station has been previously transmitting packets on the uplink at a rate equal to the quality of service parameter value that sets the maximum average bit rate. Estimating an earliest transmission time (tx) can include calculating a transmit time for a packet having M number of bits, wherein the transmit time will not cause a subsequently calculated average bit rate statistic to exceed the maximum average bit rate parameter value when a new measurement window for the average bit rate includes the transmission of the M bits in the unlabeled packet. Thus, an earliest transmission time (tx) that is too soon will raise the average bit rate statistic, while an earliest transmission time that is later will lower the average bit rate statistic. If tx is too late, it can cause an interruption in the receiving and timely processing of a real time data stream. Thus the scheduling information is related to keeping a hypothetical future calculation of a quality of service statistic within a limit set by a quality of service parameter value for the particular data steam, while attempting to uphold a limit on delaying the data and preventing such delay from rendering the data useless because it was received too late. The tx value can be calculated using an iterative algorithm that incrementally increases a tx value (i.e., a transmission time) until a newly calculated QoS statistic value (i.e., a value calculated using a hypothetical time window that includes the transmission of the packet being labeled) is equal to or less than the value of the QoS parameter that sets a limit on the QoS.

After estimating the scheduling information, the scheduling information is assigned to the unlabeled packet to produce a labeled packet, as illustrated at block 414, where, in the embodiment shown, tx and T are assigned to the unlabeled packet. This assignment of scheduling information to an unlabeled packet can be implemented by a database or a table maintained in memory that associates or links the scheduling information with a specific packet.

Next, the process determines whether or not there are additional unlabeled packets, as depicted at block 416. If there are additional unlabeled packets, the process selects a next unlabeled packet, as illustrated at block 418. Thereafter, the process iteratively returns to block 404 to continue the process of estimating scheduling information and assigning scheduling information to unlabeled packets based upon a QoS parameter and a QoS statistic. In selecting a next unlabeled packet at block 418, the process may select a next unlabeled packet in the same data stream, or the process may switch to another data stream to select a next unlabeled packet. Whether the process switches between data streams, or not, the process of labeling packets should remain ahead of the process (e.g., a queuing process) that relies on associated scheduling information to schedule labeled packets to be transmitted.

Returning to FIG. 4, if there are no additional unlabeled packets, the process ends as depicted at block 420. It should be understood that while the process may end when a data stream terminates, the process may begin again when packets in a new data stream need to be scheduled for transmission. Thus, the process depicted may be repeated as necessary to process a series of data packets, in one or multiple data streams, as dictated by the requirements of the particular system in which the process is used.

Figure 5:
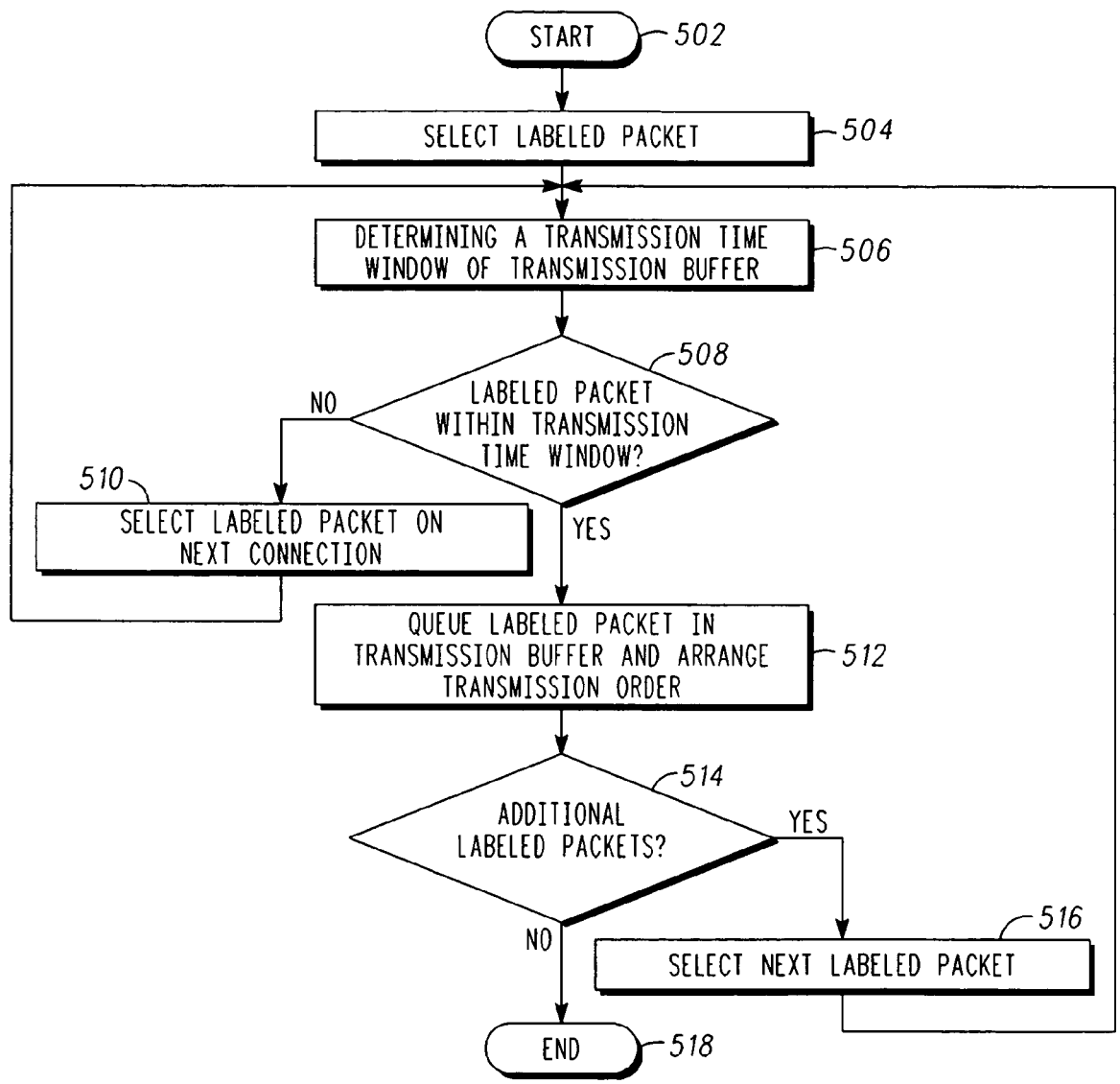
FIG. 5 shows a high-level flowchart of processes executed by a communication system that may be used to queue and arrange labeled packets within a transmission buffer in conjunction with the system of FIGS. 1-3 in accordance with one or more embodiments.

Referring now to FIG. 5, there is depicted a high-level flowchart 500 of exemplary processes executed by portions of a network node or subscriber station, such as subscriber station 102 shown in the system of FIG. 1, or executed by another similar apparatus, in accordance with one or more embodiments. As illustrated, the process begins at block 502, and thereafter passes to block 504 wherein the process selects a labeled packet. This process can be implemented by queuer 328 (see FIG. 3), which selects a labeled packet 326 that has been labeled by scheduling information estimator 316. When multiple pending labeled packets 326 belong to more than one data stream, such as data streams having different connection identifications (CIDs), the selection process will alternate between labeled packets belonging to one or the other data stream.

After selecting a labeled packet, the process determines a transmission time window of a transmission buffer, as illustrated at block 506. A transmission time window of a transmission buffer is created in response to receiving a bandwidth grant message 314. Transmission buffer 312 corresponds to a number of bytes that will be transmitted between a start time and an end time, which defines the transmission time window. The process of determining the transmission time window may be implemented within transmission buffer 312, which monitors grant messages 314 and creates a means of tracking queued packets that will be transmitted, and their order of transmission. In one embodiment, packets may be tracked by a table of pointers listed in transmission order that each point to a memory location of the corresponding data packet.

Next, the process determines whether or not the scheduling information of the selected labeled packet falls within the transmission time window, as depicted at block 508. This process can be implemented by queuer 328, which, for example, determines whether or not an earliest transmission time (tx) of the labeled packet falls within the transmission time window of the transmission buffer.

If the scheduling information of the label packet does not fall within the transmission time window, the process selects a next labeled packet on a next connection, or stream of packets, as illustrated at block 510. Once a packet in another connection is selected, the process iteratively returns to block 506, wherein the process determines a transmission time window of a transmission buffer that is currently being filled. This iterative loop from block 508, to block 510, to block 506 is a process for searching for a next labeled packet that can be queued in a transmission buffer currently being filled or scheduled with packets. The process will loop between next available labeled packets in different connection streams until a transmission buffer exists with a time window encompassing the scheduling information of the pending labeled packets. Note that in some embodiments transmission buffers are created in response to bandwidth grants 314, and transmission buffers are removed or expire after it is time to transmit the data packets, and the data packets have been transmitted.

In block 508, if the scheduling information on the labeled packet falls within the transmission time window, the process queues the labeled packet in the transmission buffer and arranges the packet in transmission order, as depicted at block 512. The process can determine whether the scheduling information falls within the transmission time window by comparing the range of the start and end transmission times of the buffer with the scheduling information, such as an earliest transmission time tx and a maximum delay time, T. If the earliest transmission time falls within the transmission time window of the transmission buffer, the process queues the labeled packet for transmission in the transmission buffer.

If labeled packets have previously been queued in the transmission buffer, they may be referred to as "queued packets." As the process queues a new packet, the process can also placed the newly queued packet in transmission order among the queued packets. In one embodiment, the process places the queued packets in ascending order of earliest transmission time tx. If the process is determining the transmission order between two packets having the same tx, the process places the labeled packet having a shorter maximum delay time T in front of a packet having a longer maximum delay time. For example, if packets have the same earliest transmission time tx the packet having the shortest maximum delay time T will go ahead of the packet having a longer maximum delay time. In this manner, queued packets can be sorted first by the earliest transmission time tx and secondarily by maximum delay time T.

After queuing the labeled packet and arranging it in transmission order, the process determines whether or not there are additional labeled packets ready for queuing and arranging, as illustrated at block 514. If the streams of packets continue to flow from the data source, the process selects a next labeled packet, as shown at block 516, and iteratively returns to block 506, wherein the process determines a transmission time window of a transmission buffer currently being filled.

If there are no additional labeled packets for any connection or data stream at block 514, which can occur when applications creating packets are terminated, the process ends as shown at block 518. It should be understood that the process shown in FIG. 5 maybe restarted when an application begins creating new packets for transmission, and the process will continue as necessary to transmit packets on the uplink channel in response to bandwidth grants.

Figure 6:
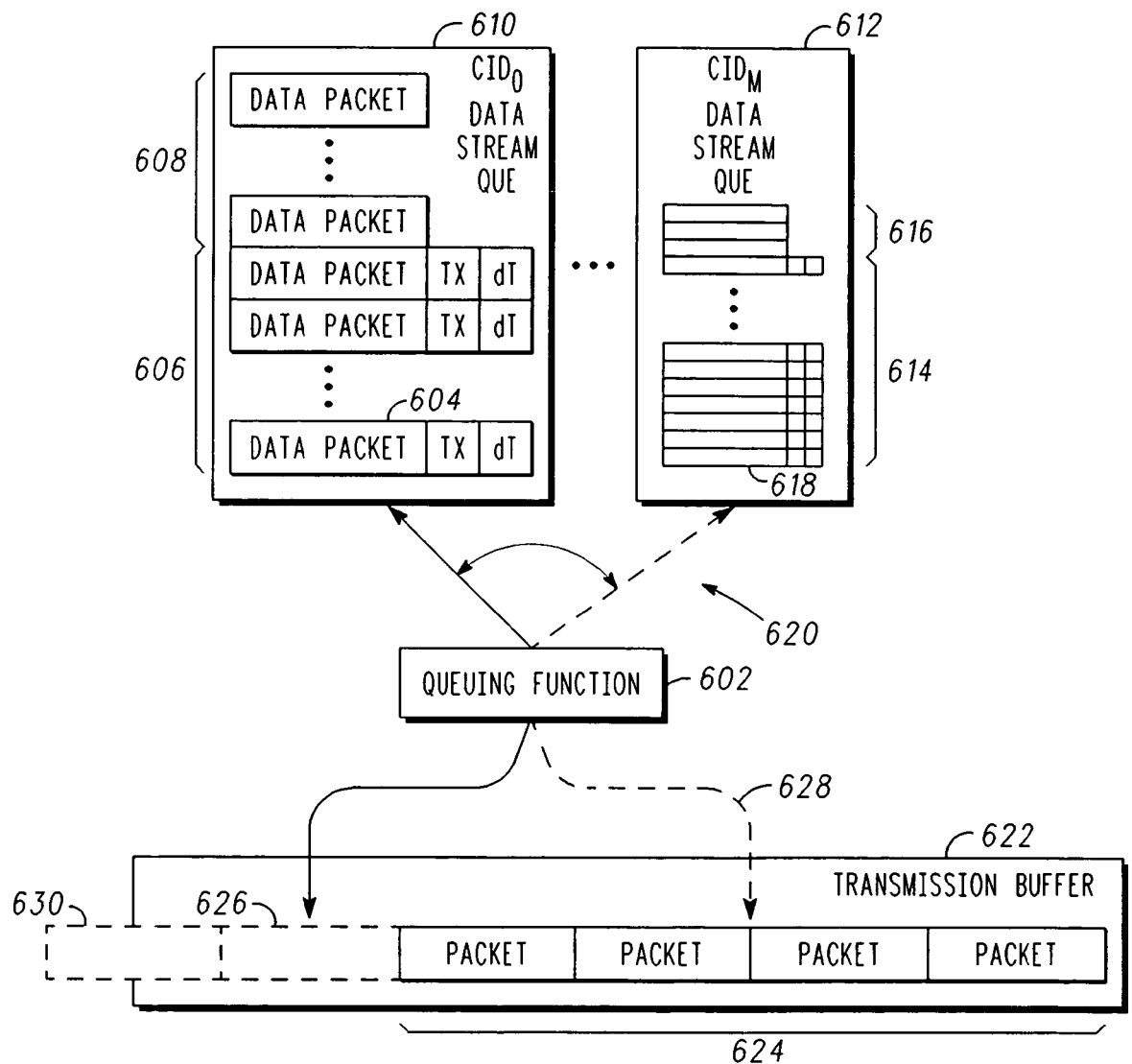
FIG. 6 depicts a schematic representation of packets queued and arranged in a transmission buffer in accordance with one or more embodiments.

FIG. 6 shows a schematic representation of packets being queued and arranged in a transmission buffer in accordance with one or more embodiments. As illustrated, queuing function 602 (which can be implemented by a queuer, such as queuer 328 in FIG. 3) selects a next labeled packet 604 among one or more labeled packets 606. Labeled packets 606 belong to a data stream with a connection identified as $CID_0$. In the embodiment shown, both labeled packets 606 and unlabeled packets 608 are stored in the data stream queue 610 for data stream $CID_0$.

If another data stream, for example $CID_M$ 612, is also present in the subscriber station, there will be another series of labeled packets 614 and unlabeled packets 616. In that case, queuing junction 602 can alternate between data stream 610 and data stream 612 to search for a next labeled packet 604 or 618. This alternating is represented by a polling, monitoring, or searching function 620, which examines the queues for labeled packets, and examines their associated scheduling information to find packets ready and qualified for queuing.

When queuing function 602 finds the labeled packet having scheduling information that falls within a transmission time window of transmission buffer 622, queuing function 602 queues or schedules the packet for transmission with the rest of the queued packets 624 in the transmission buffer.

Queuing function 602 also arranges the packets in transmission order, as indicated by the placement of queued packet 626, or the alternate placement 628 of the queued packet. If a packet, such as packet 630, contains too many bytes to fit within the remaining space in transmission buffer 622, the packet will be sent in a next transmission buffer, or the packet can be divided, so that a portion of packet 630 is queued in transmission buffer 622 and a remaining portion of packet 630 is queued in another transmission buffer.

The above described functions and structures can be implemented in one or more integrated circuits. For example, many or all of the functions can be implemented in the signal and data processing circuitry that is suggested by the block diagrams shown in FIGS. 1 and 3.

The processes, apparatus, and systems, discussed above, and the inventive principles thereof are intended to produce an improved and more efficient management of packets selected and ordered for transmission in a transmission buffer created in response to an uplink bandwidth grant. By labeling packets with scheduling information, such as the earliest transmission time and a maximum delay time, the scheduling of such labeled packets can be performed efficiently and accurately with a minimum of overhead to account for each particular packet. Additional efficiencies are gained when the subscriber station takes responsibility for managing and complying with contractual terms that specify a quality of service for the subscriber.

While the embodiments discussed above primarily relate to transmitting packets with a radio frequency signal in a wireless communications system, this system for managing data packets for transmission, and processes therein, may be used in other data transmission applications, such as transmitting data via a wireline media, such as a wideband coaxial cable, twisted-pair telephone wire, fiber optic cable, or the like.

This disclosure is intended to explain how to fashion and use various embodiments in accordance with the invention, rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, in a network node, for managing a packet for transmission comprising:
   determining one or more quality of service (QoS) statistics for previously transmitted data by calculating the QoS statistics;
   selecting a packet from a data stream;
   estimating scheduling information for the packet based upon the QoS statistics and a QoS parameter value for the data stream; and
   assigning the scheduling information to the packet by associating the scheduling information and the packet in a transmission queue,
   wherein the estimating scheduling information comprises estimating an earliest transmission time (tx) for the packet based upon one of the QoS statistics and the QoS parameter value, and determining a maximum allowed time delay (T) for the packet and
   wherein the estimating an earliest transmission time (tx) comprises estimating the earliest transmission time (tx) that will maintain an average bit transmission rate for the data stream that is equal to or below a QoS parameter value for an average bit rate for the data stream.

2. The method for managing a packet for transmission according to claim 1 wherein the estimating scheduling information comprises estimating a scheduling window for the packet based upon the QoS statistics and the QoS parameter value.

3. The method for managing a packet for transmission according to claim 1 wherein the estimating scheduling information comprises estimating a scheduling window for the packet based upon the QoS statistics and the QoS parameter value, wherein the scheduling window corresponds to the earliest transmission time and a latest transmission time.

4. The method for managing a packet for transmission according to claim 1 wherein the estimating scheduling information comprises estimating scheduling information for the packet based upon the QoS statistics and a QoS parameter value representing the average bit transmission rate.

5. The method for managing a packet for transmission according to claim 1 wherein the determining one or more QoS statistics for the previously transmitted data comprises measuring the average bit transmission rate for previously transmitted data in the data stream.

6. The method for managing a packet for transmission according to claim 1 further including:
   determining a transmission time window of a transmission buffer; and
   in response to the tx of the packet falling within the transmission time window, queuing the packet for transmission in the transmission buffer.

7. The method for managing a packet for transmission according to claim 6 wherein the queuing the packet comprises arranging the packet among one or more queued packets that are queued for transmission in the transmission buffer in response to comparing tx and T values of the packet with tx and T values of the one or more queued packets.

8. The method for managing a packet for transmission according to claim 7 wherein the arranging comprises arranging the packet ahead, in a transmission order, of a queued packet that has a tx later than the tx of the packet.

9. The method for managing a packet for transmission according to claim 7 wherein the arranging comprises arranging the packet ahead, in a transmission order, of a queued packet that has a same tx and a larger T than the T of the packet.

10. A system, in a network node, for managing packet transmission comprising:
    a quality of service (QoS) parameter processor for obtaining a QoS parameter value for data to be transmitted from the network node;
    a QoS statistics monitor for determining one or more quality of service (QOS) statistics for previously transmitted data based on statistical transmission rates for the previously transmitted data;
    a packet source for generating a packet; and
    a scheduling information estimator, coupled to the packet source, the QoS parameter processor, and the QoS statistics monitor, for estimating scheduling information for the packet based upon one of the QoS statistics and the QoS parameter value, and for assigning the scheduling information to the packet by associating the scheduling information and the packet in a transmission queue,
    wherein the scheduling information estimator comprises a scheduling window estimator for estimating an earliest transmission time (tx) and a maximum allowed time delay (T) based upon the QoS parameter value and the QoS statistics, and for assigning tx and T to the packet and
    wherein the scheduling information estimator comprises a calculator for calculating tx, wherein tx is calculated such that it will not cause an average transmission speed for the data stream to exceed the QoS parameter value for the data stream.

11. The system for managing packet transmission according to claim 10 wherein the scheduling information estimator comprises a scheduling window estimator for estimating a scheduling window corresponding to the earliest transmission time and a latest transmission time based upon the QoS parameter value and the QoS statistics.

12. The system for managing packet transmission according to claim 10 wherein the Qos statistics monitor comprises an average bit rate calculator for measuring an avenge bit rate for the data stream.

13. The system for managing packet transmission according to claim 10 further including:
    a transmission buffer for buffering queued packets for transmission during a transmission time window; and
    a queuer coupled to the transmission buffer for queuing the packet in response to the tx value assigned to the packet falling within the transmission time window.

14. The system for managing packet transmission according to claim 13 wherein the queuer comprises a packet arranger for arranging the packet among one or more queued packets in the transmission buffer in response to comparing tx and T values of the packet with tx and T values of the one or more queued packets.

15. The system for managing packet transmission according to claim 14 wherein the packet arranger comprises a packet arranger for arranging the packet ahead, in a transmission order, of a queued packet that has a later tx than the tx of the packet.

16. A method, in a network node, for managing a packet for transmission comprising:
- obtaining a quality of service (QoS) parameter value for a data stream;
- determining one or more QoS statistics for previously transmitted data;
- selecting a packet from the data stream;
- estimating an earliest transmission time (tx) for the packet based upon one of the QoS statistics and the QoS parameter value;
- determining a maximum allowed time delay (T) for the packet;
- assigning the tx and the T to the packet by associating the tx and the T with the packet in a transmission queue;
- determining a transmission time window of a transmission buffer; and
- in response to the tx of the packet falling within the transmission time window, queuing the packet for transmission in the transmission buffer, and arranging the packet ahead, in a transmission order, of a queued packet that has a tx later than the tx of the packet.

* * * * *